(12) United States Patent
Gualdoni et al.

(10) Patent No.: US 6,217,132 B1
(45) Date of Patent: Apr. 17, 2001

(54) HYDRAULIC CONTROL UNIT HAVING A MASTER CYLINDER AND ANTI-LOCK BRAKING VALVES INTEGRALLY MOUNTED THEREIN

(75) Inventors: Glenn R. Gualdoni, Milford; Patrick H. Hool, St Clair; Serge G. Avenel, Novi, all of MI (US); Frank P. Lubischer, Boppard (DE); Norbert Sternal, Troy, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/204,648

(22) Filed: Dec. 2, 1998

Related U.S. Application Data (60) Provisional application No. 60/067,331, filed on Dec. 2, 1997.

(51) Int. Cl.[7] ....................................................... B60T 13/14
(52) U.S. Cl. ..................................... 303/113.1; 303/119.1; 303/DIG. 3
(58) Field of Search .............................. 303/113.1, 114.1, 303/DIG. 3, DIG. 4, DIG. 10, 122.11, 68–69, 50, 52, 10–12, 119.1, 119.2, 166, 116.1, 15; 188/358, 359, 151 A; 60/545, 581, 582

(56) References Cited

U.S. PATENT DOCUMENTS

| | | |
|---|---|---|
| 3,827,242 * | 8/1974 | Belart . |
| 3,980,345 | 9/1976 | Doerfler . |
| 4,440,454 * | 4/1984 | Belart et al. . |
| 4,603,918 * | 8/1986 | Leiber et al. ................... 188/359 |
| 4,828,333 * | 5/1989 | Reinartz et al. . |
| 4,828,335 | 5/1989 | Fuller et al. . |
| 5,000,525 * | 3/1991 | Reinartz et al. . |
| 5,332,303 | 7/1994 | Wupper . |
| 5,390,987 | 2/1995 | Willi et al. . |

* cited by examiner

Primary Examiner—Douglas C. Butler
(74) Attorney, Agent, or Firm—MacMillan, Sobanski & Todd, LLC (57) ABSTRACT

A vehicle brake system including a wheel brake and a master cylinder operable to provide pressurized fluid to the wheel brake. The master cylinder includes a housing having a bore formed therein, and further including a piston slidably disposed in the bore. The brake system further includes a fluid reservoir in selective fluid communication with the bore of the master cylinder. The brake system also includes an isolation valve movable between an open position, wherein fluid is permitted to flow between the master cylinder and the wheel brake, and a closed position, wherein fluid is restricted from flowing between the master cylinder and the wheel brake. The brake system further includes a dump valve movable between a closed position, wherein fluid is prevented from flowing between the wheel brake and the reservoir, and an open position, wherein fluid is permitted to flow between the wheel brake and the reservoir. The brake system additionally including a cut-off valve movable between an open position, wherein fluid is permitted to flow between the dump valve and the reservoir, and a closed position, wherein fluid is restricted from flowing between the dump valve and the reservoir.

12 Claims, 5 Drawing Sheets

HYDRAULIC CONTROL UNIT HAVING A MASTER CYLINDER AND ANTI-LOCK BRAKING VALVES INTEGRALLY MOUNTED THEREIN

This application claims provisional application Ser. No. 60/067331 filed Dec. 2, 1997.

BACKGROUND OF THE INVENTION

This invention relates in general to an improved hydraulic brake system for use in a vehicle, and in particular to an anti-lock braking system.

Vehicle braking systems generally include a driver operated brake pedal which is connected to a master cylinder. The master cylinder is in fluid communication with brakes at associated wheels of the vehicle. Operation of the brake pedal generates pressure within the master cylinder which is supplied to the brakes, thereby decelerating the vehicle or preventing the vehicle from moving from a stopped position. A booster may also be provided between the brake pedal and the master cylinder to assist the pedal effort by the driver of the vehicle.

Typical anti-lock braking systems (ABS systems) further include a separate hydraulic control unit (HCU) in fluid communication between the master cylinder and selected brakes. The HCU incorporates a plurality of solenoid operated valves to selectively control the application of hydraulic fluid pressure to the selected brakes to prevent locking of the associated wheels. Generally, the valves cyclically relieve and reapply pressure to the associated brakes to limit wheel slippage to a safe level while continuing to produce adequate brake torque to decelerate the vehicle as desired by the driver.

ABS systems can be configured to independently control the application of fluid to all four brakes associated with a four wheeled vehicle. Alternatively, an ABS system can be configured to control the application of fluid to the brakes associated with the rear wheels of the vehicle, such as the ABS system disclosed in U.S. Pat. No. 4,828,335 to Fuller et al.

Typically, the HCU of an ABS system includes a fluid accumulator for the storage of fluid which is diverted from the wheel brakes during an ABS function. A conventional accumulator includes a variable volume fluid reservoir which is maintained at a slightly elevated pressure by a slidable piston disposed therein. The accumulator includes a spring which biases the piston. Fluid enters the reservoir of the accumulator causing the piston to move against the biasing of the spring, thereby increasing the size of the reservoir to store fluid. If one or more of the solenoid valves for selectively controlling the application of pressure to the brakes is faulty such that fluid leaks therethrough, the accumulator will generally fill up, thereby preventing further loss of fluid from the controlled brake circuit. Due to the size of the accumulator and the solenoid valves, the HCU is generally located remotely from the master cylinder and is in fluid communication therewith by a series of brake fluid conduits and connections. However, the accumulator adds weight and cost to the brake system.

BRIEF SUMMARY OF THE INVENTION

This invention relates in general to an improved brake system for use in vehicles, and in particular to an anti-lock brake system. The vehicle brake system generally includes a wheel brake, a master cylinder, a reservoir, an isolation valve, a dump valve, and a cut-off valve which are preferably disposed in a single housing. The master cylinder is operable to provide pressurized fluid to the wheel brake by actuation of a brake pedal operatively connected to the master cylinder. The master cylinder includes a housing having a bore formed therein, and further including a piston slidably disposed in the bore. The fluid reservoir is in selective fluid communication with the bore of the master cylinder which defines a fluid chamber. The isolation valve is movable between an open position, wherein fluid is permitted to flow between the master cylinder and the wheel brake, and a closed position, wherein fluid is restricted from flowing between the master cylinder and the wheel brake. The dump valve is movable between a closed position, wherein fluid is prevented from flowing between the wheel brake and the reservoir, and an open position, wherein fluid is permitted to flow between the wheel brake and the reservoir. The a cut-off valve is movable between an open position, wherein fluid is permitted to flow between the dump valve and the reservoir, and a closed position, wherein fluid is restricted from flowing between the dump valve and the reservoir.

In a specific embodiment of the invention, the piston of the master cylinder includes a ramped surface defined by a frustoconical portion formed about the piston. The ramped surface cooperates with a contact member of the cut-off valve to engage and disengage a valve member against a valve seat caused by the movement of the piston of the master cylinder.

Various objects and advantages of this invention will become apparent to those skilled in the art from the following detailed description of the preferred embodiment, when read in light of the accompanying drawings.

DESCRIPTION OF THE INVENTION

Figure 1:
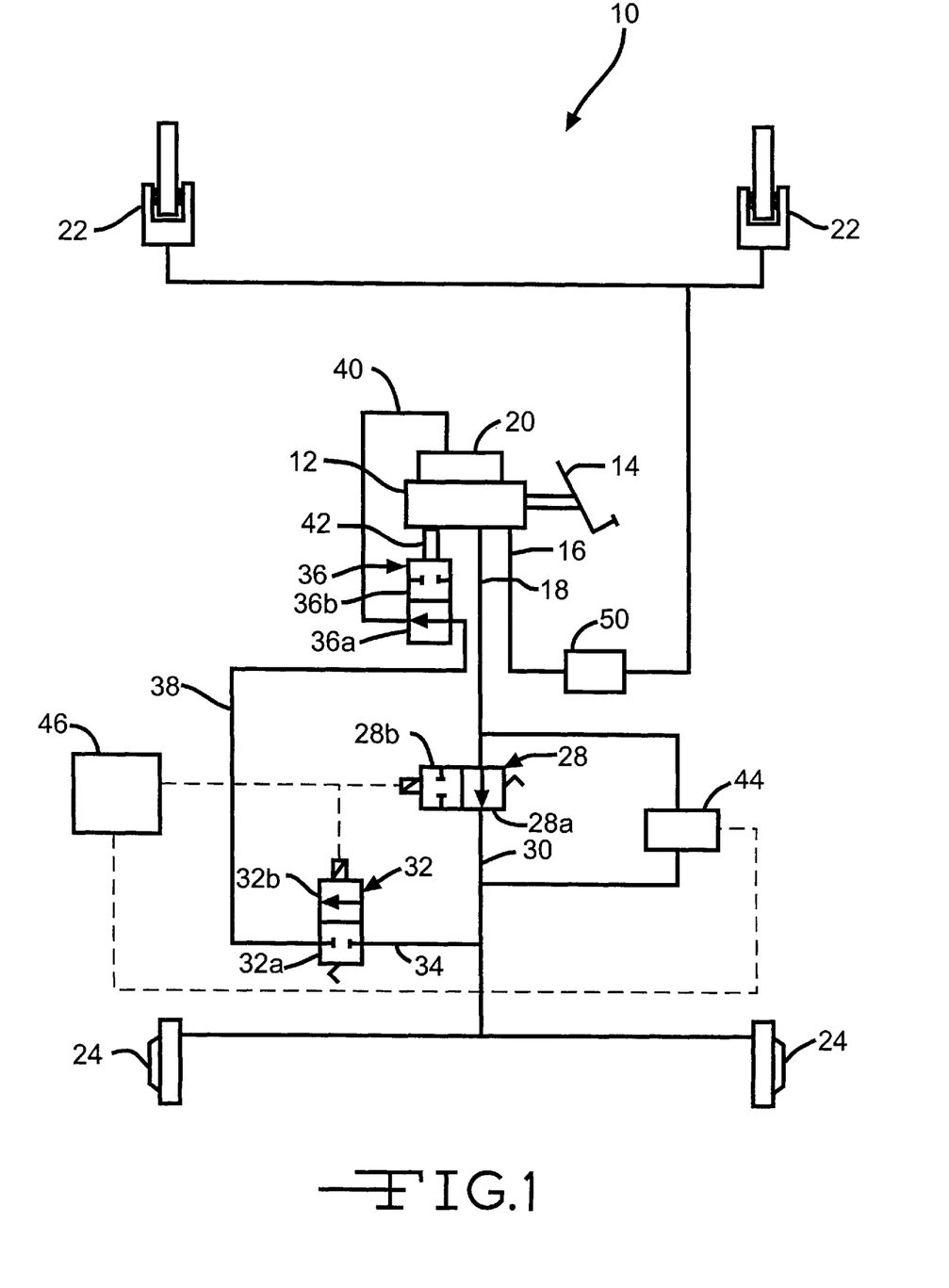
FIG. 1 is a hydraulic schematic of a brake system, in accordance with the invention.

Referring now to the drawings, there is illustrated in FIG. 1, a hydraulic schematic of a brake system 10, in accordance with the present invention. The brake system 10 includes a master cylinder 12 which is actuated by a brake pedal 14. The brake pedal 14 is operated by the driver of the vehicle in which the brake system 10 is installed. If desired, a booster (not shown), such as a vacuum or hydraulic booster, can be positioned between the brake pedal 14 and the master cylinder 12 in a conventional manner to assist the pedal effort by the driver of the vehicle. Preferably, the master cylinder 12 is a tandem master cylinder for generating fluid pressure in a pair of conduits 16 and 18, respectively. The master cylinder 12 is in fluid communication with a fluid reservoir 20. The brake system 10 includes a pair of wheel brakes 22 which are in fluid communication with the master cylinder 12 via the conduit 16. The brake system 10 further includes a pair of wheel brakes 24 which are selectively in fluid communication with the master cylinder 12 via the conduit 18. Preferably, the pair of wheel brakes 22 are associated with the front wheels of the vehicle, and the pair of wheel brakes 24 are associated with the rear wheels of the vehicle. Although the wheel brakes 22 are schematically shown as disc brakes, and the wheel brakes are schematically shown as drum brakes, the wheel brakes 22 and 24 can be any suitable wheel brake configuration. As will be explained in detail below, the brake system 10 provides anti-lock braking to the wheel brakes 24.

The brake system 10 further includes an isolation valve 28 in fluid communication with the conduit 18. The isolation valve 28 is also in fluid communication with a fluid conduit 30 in fluid communication with the wheel brakes 24. The isolation valve 28 regulates the flow of fluid between the master cylinder 12 and the wheel brakes 24 via the conduits 18 and 30. Preferably, the isolation valve 28 is a solenoid actuated normally open, two position valve movable between an open position 28a and a closed position 28b. The brake system 10 also includes a dump valve 32 which is in fluid communication with the conduit 30 via a fluid conduit 34. The dump valve 32 is also in fluid communication with a cut-off valve 36 via a fluid conduit 38. The dump valve 32 regulates the flow of fluid between the conduit 34 and the conduit 38. Preferably, the dump valve 32 is a solenoid actuated normally closed, two position valve movable between a closed position 32a and an open position 32b. Of course, the isolation valve 28 and the dump valve 32 can be any suitable valve arrangement which selectively permits and restricts the flow of fluid therethrough.

The cut-off valve 36 is in fluid communication with the reservoir 20 via a fluid conduit 40. As will be explained in detail below, the cut-off valve 36 selectively regulates the flow of fluid between the dump valve 32 and the reservoir 20 via the conduits 38 and 40. Preferably, the cut-off valve 36 is a two position valve movable between an open position 36a and a closed position 36b. The cut-off valve 36 can be any suitable valve arrangement which selectively restricts and permits the flow of fluid therethrough. Furthermore, the cut-off valve 36 can be actuated by any suitable method such as mechanically or electrically, such as by a solenoid. As schematically represented in FIG. 1, the cut-off valve 36 is actuated by an actuation member 42 operatively connected to the master cylinder 12, as will be explained in detail below.

Preferably, the brake system 10 includes a pressure differential switch or reset switch 44 which monitors the differential pressure across the isolation valve 28, the reason for which will be explained below. The pressure differential switch 44 is electrically connected to an electronic control unit (ECU) 46. The solenoids of the isolation valve 28 and the dump valve 32 are controlled by the ECU 46. The ECU 46 is also connected to various sensors (not shown), which monitor various vehicle parameters, such as vehicle speed, wheel speed, and operation of the brake pedal 14. The brake system 10 may also include a metering valve 50 disposed in the conduit 16, the reason for which will be explained below.

Note that unlike conventional ABS, the brake system 10 does not include a separate fluid accumulator for storage of fluid diverted from selected wheel brakes by a dump valve. In most conventional ABS systems, when the dump valve is actuated to an open position, the fluid is diverted to the accumulator. In contrast, when the dump valve 32 of the brake system 10 is actuated to its open position 32b, the fluid is diverted to the reservoir 12 or a relatively low pressure area within the master cylinder 12, as will be explained in detail below.

The operation of the brake system 10 will now be explained. During normal brake apply, e.g., when the brake system 10 is not operating under an ABS function or mode, the brake system 10 generally applies pressure to both pairs of wheel brakes 22 and 24. More specifically, during normal brake apply, the driver of the vehicle actuates the brake pedal 14 which moves a pair of pistons (not shown in FIG. 1) within the master cylinder 12. The movement of the pistons generates pressurized fluid within the conduits 16 and 18, respectively. The pressurized fluid within the conduit 16 actuates the wheel brakes 22. During normal brake apply, the isolation valve 28 is normally in its open position 28a, as shown, to permit the flow of fluid between the conduits 18 and 30. Thus, the pressurized fluid within the conduit 18 actuates the wheel brakes 24. Note that during normal brake apply, the dump valve 32 is typically in its closed position 32a, as shown, so as to prevent or restrict the flow of fluid between the conduits 34 and 38. Thus, the pressurized fluid within the conduit 30 is generally prevented from flowing into the reservoir 20 via the conduits 34, 38, and 40 during normal brake apply.

When the brake pedal 14 is released by the driver, the pressurized fluid from the wheel brakes 22 flows back into the master cylinder 12 via the conduit 16, and the pressurized fluid from the wheel brakes 24 flows back into the master cylinder 12 via the conduits 30 and 18.

During normal brake apply, the ECU 46 monitors the wheel speed and deceleration of the wheels associated with the wheel brakes 24 and functions to control the application of hydraulic fluid pressure to the wheel brakes 24 in order to prevent a lockup condition of the wheel brakes 24. If the ECU 46 detects excessive lockup of the wheel brakes 24, the brake system 10 may enter into an ABS mode. Entering into an ABS mode, the ECU 46 actuates the isolation valve 28 to its closed position 28b to restrict the flow of fluid between the conduits 18 and 30, thereby generally holding the pressure within the conduit 30 at its present level. If, after the isolation valve 28 has been actuated to its closed position 28b, and the wheel deceleration rate of the wheels associated with the wheel brakes 24 exceeds a predetermined amount, the ECU 46 may actuate the dump valve 32 to its open position 32b to reduce the pressure within the conduit 30 the fluid is diverted through the dump valve 32 to the reservoir 20 via the conduits 38 and 40. Note that the cut-off valve 36 will normally be in its open position 36a, thereby permitting the flow of fluid from the dump valve 32 to the reservoir 20. The brake system 10 may enter into a series of pressure dumping of the fluid in the conduit 30 as described above.

In some instances, after an impeding lockup condition has been corrected under an ABS mode, it is desirable to reapply additional pressure to the wheel brakes 24 to increase braking. Under these conditions, the pressure held in the conduit 30 to the wheel brakes 24 can generally be increased to provide further braking without causing a lockup condition of the wheel brakes 24. This can be accomplished by momentarily opening the isolation valve 28 to its open position 28a to permit the higher pressure fluid in the conduit 18 to be supplied to the conduit 30. Due to the continuous braking effort by the driver on the brake pedal 14 under a hard braking condition, the pressure in the conduit 18 will generally be higher than the pressure in the conduit 30.

Normally, during normal braking or during an ABS braking mode, the cut-off valve 36 remains in its open position 336a to permit the flow of fluid between the dump valve 32 and the reservoir 20 via the conduits 38 and 40. However, it is sometimes desirable to actuate the cut-off valve 36 to its closed position 36b. The cut-off valve 36 can be actuated mechanically. For example, the position of a piston of the master cylinder 12 can cause movement of the actuating member 42 to actuate the cut-off valve 36. If the piston within the master cylinder 12, which pressurizes the fluid for the conduit 18, has traveled a predetermined distance, the cut-off valve 36 can close, thereby restricting the flow of fluid in a direction from the dump valve 32 to the reservoir 20. For example, an undesirable condition can occur when the dump valve 32 is faulty such that fluid leaks through the dump valve 32 when the dump valve 32 is in its closed position 32a. Under this scenario, the pistons of the master cylinder 12 will advance to compensate for the loss in pressure from the fluid escaping from the conduit 30. The movement of the pistons in the master cylinder 12 can actuate the cut-off valve 36 to its closed position 36a, thereby preventing the draining of pressurized fluid from the conduit 30 to the reservoir 20. Also, if the pistons of the master cylinder 12 have reached an undesirable position near the end of their travel length, the cut-off valve 36 may be actuated to its closed position 36b to prevent further dumping of fluid from the conduit 30, regardless of the position of the dump valve 32.

As stated before, the brake system 10 may also include the optional metering valve 50 disposed in the conduit 16. The metering valve 50 delays the application of pressurized fluid to the wheel brakes 22. For example, the pair of wheel brakes 22 can be disk brakes which are associated with the front wheels of the vehicle, and the pair of wheel brakes 24 can be drum brakes which are associated with the rear wheels of the vehicle. The metering valve 50 delays the application of pressurized fluid to the front wheel disk brakes 22 until the hydraulic pressure has increased sufficiently to overcome the rear drum wheel brakes 24. Without a metering valve 50, the front disk wheel brakes 22 could be applied before the rear drum wheel brakes 24 causing the front disk wheel brakes 22 to provide all the braking force during easy stops and, thereby accelerating wear of disk brake pads associated with the wheel brakes 22.

Although the brake system 10 is shown as having only anti-lock braking capability on the brake circuit associated with the conduit 18, the brake system 10 could be configured so as to have similar components on the brake circuit associated with the conduit 16. For example, a second isolation valve (not shown) may be located within the conduit 16, and a second dump valve (not shown) may be used to divert fluid to the reservoir 20. A second cut-off valve (not shown) may also be incorporated between the dump valve and the reservoir 20. The second cut-off valve may then be actuated by the position of one of the pistons of the master cylinder 12.

The reset switch 44 monitors the differential pressure across the isolation valve 28 to generate a signal informing the ECU 46 if the driver of the vehicle has released the brake pedal 14 after an ABS braking event, thereby relating the driver's intentions to cease braking.

Figure 2:
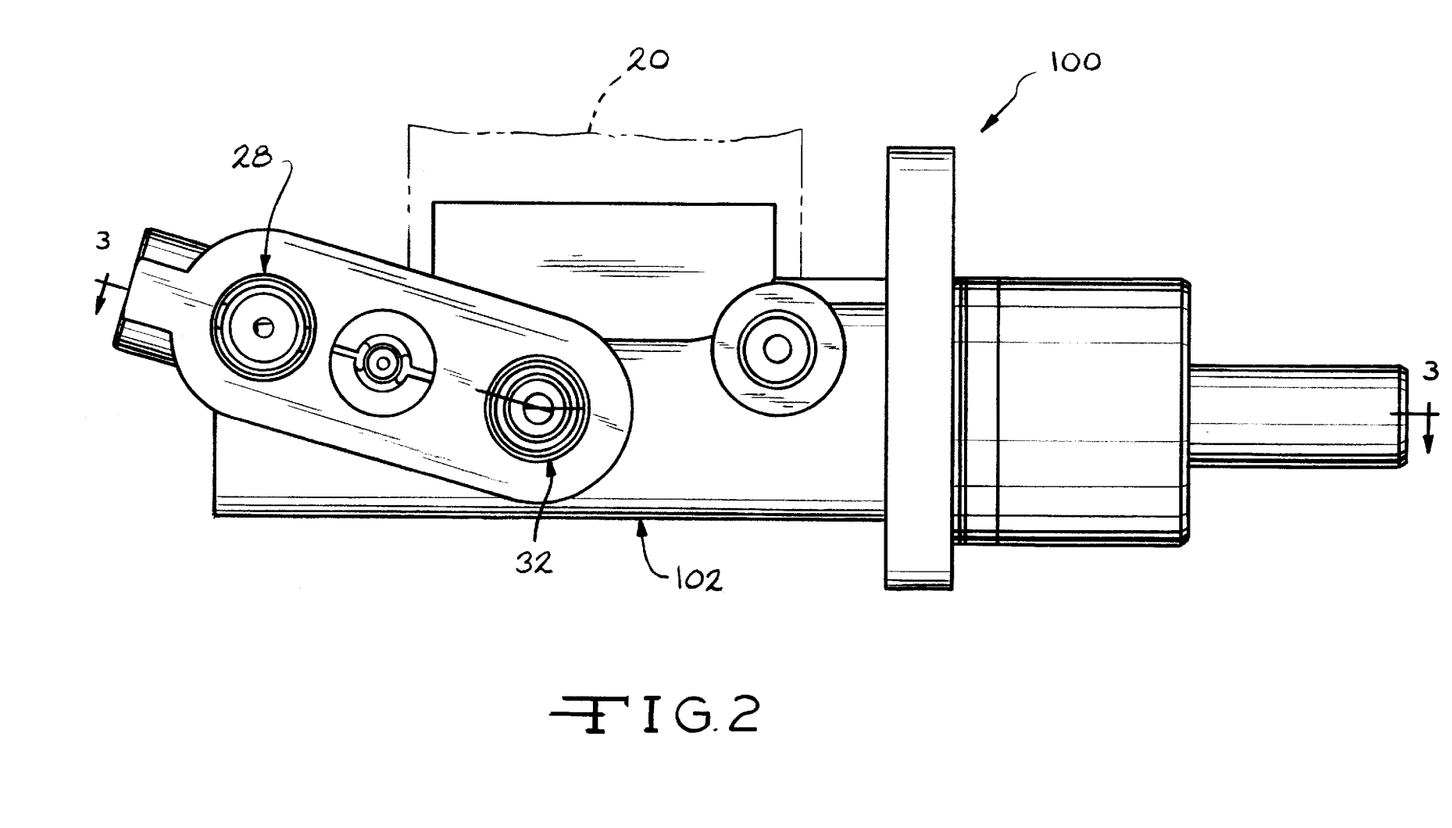
FIG. 2 is a side elevational view of a first embodiment of a hydraulic control unit (HCU) having a master cylinder, an isolation valve, a dump valve, and a cut-off valve mounted therein.
Figure 3:
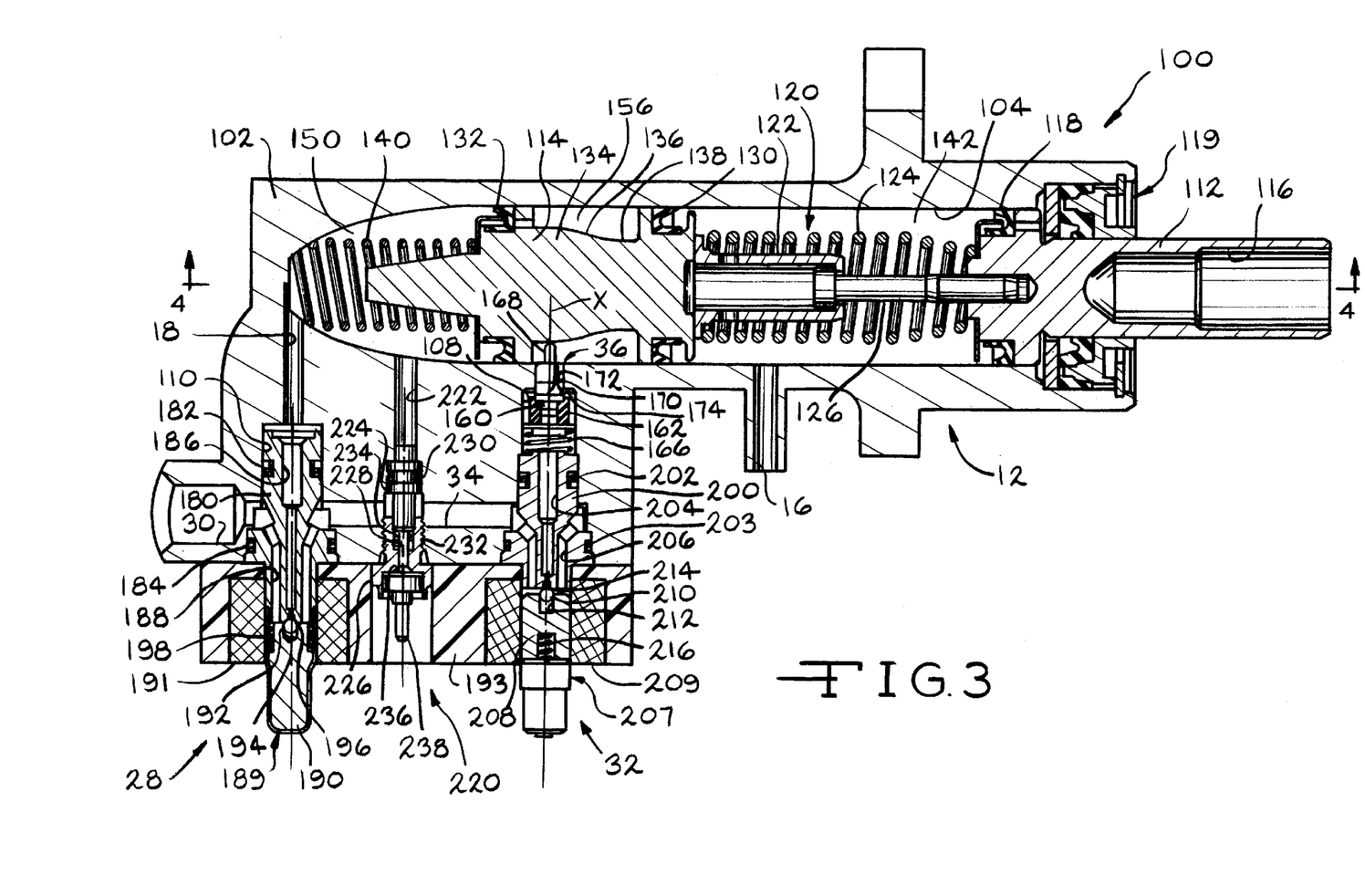
FIG. 3 is a sectional view of the HCU taken along Lines 3—3 of FIG. 2.
Figure 4:
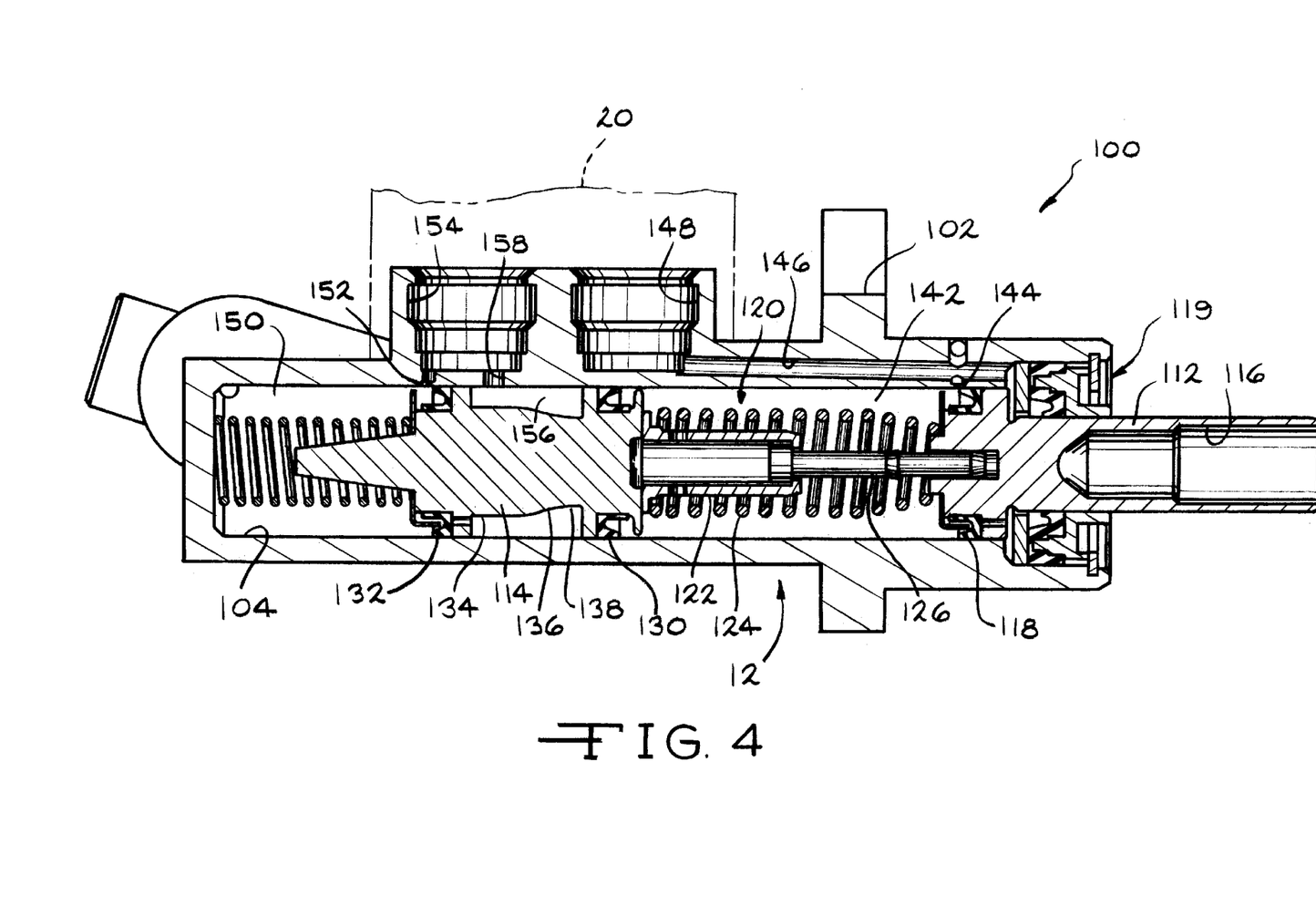
FIG. 4 is a sectional view of the HCU taken along Line 4—4 of FIG. 3.

Preferably, the master cylinder 12, the isolation valve 28, the dump valve 32, the cut-off valve 36, and the pressure differential switch 44 are integrally housed in a single valve housing, to reduce the cost of the brake system 10. There is illustrated in FIGS. 2 through 4, a first embodiment of a hydraulic brake unit (HCU) 100, having similar components as the brake system 10, which are integrally housed therein. For simplicity, like reference numbers may be used for similar components, such as the master cylinder 12, the isolation valve 28, the dump valve 32, the cut-off valve 36, the reset switch 44, and various conduits and passageways.

The HCU 100 includes a housing 102 which can be formed from a block of suitable material, such as aluminum. The housing 102 has a plurality of bores 104, 108, and 110 formed therein. The master cylinder 12 is generally housed in the bore 104. The cut-off valve 36 and the isolation valve 28 are generally housed in the bore 108. The dump valve 32 is generally housed in the bore 110.

As shown in FIGS. 3 and 4, the master cylinder 12 includes a primary piston 112 and a secondary piston 114 which are slidably disposed within the bore 104 of the housing 102. The primary piston 112 has an axial bore 116 for receiving an input rod (not shown) operatively connected to the brake pedal 14 of the brake system 10 of FIG. 1. The primary piston 112 is sealingly engaged with the wall of the bore 104 by an elastomeric lip seal 118 seated on the primary piston 112. The primary piston 112 is retained in the bore 104 of the housing 102 by an end plug assembly, indicated generally at 119.

Positioned between the primary piston 112 and the secondary piston 114 is a caged spring assembly, indicated generally at 120. The cage spring assembly 120 includes an annular retainer 122, a spring 124, and a pin 126. The pin has a head 128 which is slidably retained in the retainer 122. The pin 126 is attached to the primary piston 112, such as by a threaded connection or a press fit. The caged spring assembly 120 positions the secondary piston 114 at a predetermined distance from the primary piston 112. The caged spring assembly 120 also biases the primary piston 112 and the secondary piston 114 away from each other when the distance therebetween is less than the predetermined distance.

The secondary piston 114 is sealingly engaged with the wall of the bore 104 by a pair of elastomeric lip seals 130 and 132 seated on the secondary piston 114. The secondary piston 114 has a cylindrical large diameter portion 134, a frustoconical portion 136, and a cylindrical small diameter portion 138, which are located between the pair of seals 130 and 132, the reason for which will be explained in detail below. A return spring 140 biases the secondary piston 114 in a direction towards the primary piston 112.

The master cylinder 12 includes a primary chamber 142 generally defined by the bore 104 of the housing 102, the primary piston 112, the lip seal 118, the secondary piston 114, and the lip seal 130. The primary chamber 142 is in fluid communication with the wheel brakes 22 of the brake system 10 via the conduit 16. When the primary piston 112 is at a rest position, such as that shown in FIG. 4, the primary chamber 142 is in fluid communication with the reservoir, indicated by the phantom lines 20, via a compensation port 144, a conduit 146, and a bore 148 formed in the housing 102. The master cylinder 12 further includes a secondary chamber 150 generally defined by the bore 104 of the housing 102, the secondary piston 114, and the lip seal 132. Note that the elliptical shape of the secondary chamber 150 in FIG. 3 is the result of the angled sectional cut of the Lines 3—3 of FIG. 2. When the secondary piston 114 is at a rest position, such as that shown in FIG. 4, the secondary chamber 150 is in fluid communication with the reservoir 20 via a compensation port 152 and a bore 154 formed in the housing 102. The master cylinder 12 also includes a low pressure chamber 156 generally defined by the bore 104 of the housing 102, the lip seals 130 and 132, and the secondary piston 114 adjacent the large diameter portion 134, the frustoconical portion 136, and the small diameter portion 138. The low pressure chamber 156 is in fluid communication with the reservoir 20 via a fluid port 158 and the bore 154.

As shown in FIG. 3, the cut-off valve 36 is positioned between the dump valve 32 and the low pressure chamber 156 of the master cylinder 12. The cut-off valve 36 includes an axial stem 160 movable along an axis "X" which generally normal to the axis defined by the primary and second pistons 112 and 114. The cut-off valve 36 has a valve seal 162 formed about the axial stem 160. A spring 166 biases the axial stem 160 and the valve seal 162 in a direction towards the secondary piston 114. The axial stem 160 includes a contact member or extension pin 168 which can be in sliding contact with either the large diameter portion 134, the frustoconical portion 136, or the small diameter portion 138 of the secondary piston 114, the reason for which will be explained below. The axial stem 160 also includes an intermediate portion 170 having a triangular shaped cross-section which is disposed in a small diameter portion 172 of the bore 106. The triangular shaped cross-section of the intermediate portion 138 permits the flow of fluid between the intermediate portion 138 and the small diameter portion 172 yet reduces undesirable radial movement therein. A valve seat 174 is formed from a shoulder formed between the bores 106 and 172 of the housing 102. Depending on their respective positions, the valve seat 174 and valve seal 162 cooperate to permit or restrict the flow of fluid between the low pressure chamber 156, which is in fluid communication with the reservoir 20, and the dump valve 32.

As shown in FIG. 3, the isolation valve 28 includes a body 180 which is sealingly disposed within the bore 108 of the housing 102 by a pair of seals 182 and 184. The body 180 has an axial bore 186 formed therethrough. The axial bore 186 is in fluid communication with the secondary chamber 150 of the master cylinder 12 via the conduit 18. The body 180 has a plurality of passageways 188 formed therein. The passageways 188 are in fluid communication with the wheel brakes 24 via the conduit 30. The isolation valve 28 further includes a solenoid, indicated generally at 189, having an armature 190 which is actuated by a coil 191 disposed in a second housing 193 fastened to the housing 102. The second housing 193 is preferably made of a non-conducting material such as plastic. The armature 190 includes a valve member, such as a ball 192 press fit into a bore 194 formed in the armature 190. The ball 192 cooperates with a valve seat 196 formed in the body 180 adjacent an opening of the axial bore 186 to prevent or permit the flow of fluid between the axial bore 186 and the passageways 188. A spring 198 biases the armature 190 in a direction away from the body 180 so as to unseat the ball 192 from the valve seat 196 when the isolation valve 28 is in its normally open position 28a.

As shown in FIG. 3, the dump valve 32 includes a body 200 which is sealingly disposed within the bore 110 of the housing 102 by a pair of seals 202 and 203. The body 200 has an axial bore 204 formed therethrough. The axial bore 204 is in fluid communication with the low pressure chamber 156 through the cut-off valve 36. Note that the axial bore 204 functions as the conduit 38 of the brake system 10 illustrated in FIG. 1. The body 200 has a plurality of passageways 206 formed therein. The passageways 206 are in fluid communication with the conduit 34 extending between the isolation valve 28 and the dump valve 32. The dump valve 32 further includes a solenoid, indicated generally at 267, having an armature 208 which is actuated by a coil 209 disposed in the second housing 193. The armature 208 includes a valve member, such as a ball 210 press fit into a bore 212 formed in the armature 208. The ball 210 cooperates with a valve seat 214 formed in the body 200 adjacent the opening of the axial bore 204 to prevent or allow the flow of fluid between the axial bore 204 and the passageways 206. A spring 216 biases the armature 208 in a direction towards the body 200 so as to seat the ball 210 against the valve seat 214 when the dump valve 32 is in its normally closed position.

The HCU 100 may also include the optional electronic reset switch assembly 44, disposed in a bore 222 formed in the housing 102. The reset switch assembly 44 includes a plunger 224 slidably disposed in the bore 222 for limited axial movement The plunger 224 is retained in the bore 222 by a cap 226 threadably attached to the housing 102. The cap 226 has an axial bore 228 formed therethrough. A seal 230 is disposed about the plunger 224 to sealingly engage with the wall of the bore 222 formed in the housing 102. The plunger 224 further includes an pin 232 extended therefrom and disposed in the axial bore 228 of the cap 226. A seal 234 is disposed in the axial bore 228 and sealingly engages the pin 232. The reset switch assembly 44 further includes an electrical contact 236. The electrical contact includes a jack 238 for electrical connection with the ECU 46. The plunger 224 is biased by the pressure differential between the secondary chamber 150 of the master cylinder 12 and the conduit 34. As will be discussed below, the reset switch 44 is movable to a position to generate a signal informing the ECU 46 if the driver of the vehicle has released the brake pedal 14 after an ABS braking event. Note that fluid in the conduit 34 can flow around the plunger 224.

The operation of the HCU 100 shall now be discussed in cooperation with the brake system 10. During normal brake apply, e.g., when the brake system 10 is not operating under an ABS mode, the driver of the vehicle actuates the brake pedal 14 which operatively moves the primary piston 112 leftward, as viewing FIGS. 3 and 4. The movement of the primary piston 112 causes the fluid communication between the reservoir 20 and the primary chamber 142 to be cut off as the result of the lip seal 118 moving past the compensation port 144. Thus, the fluid pressure within the primary chamber 142 increases and fluid flows out through the conduit 16 to the wheel brakes 22. The increase pressure in the primary chamber 142 causes leftward movement of the secondary piston 114, as viewing FIGS. 3 and 4. The fluid communication between the reservoir 20 and the secondary chamber 150 is then cut off as the result of the lip seal 132 moving past the compensation port 152. Thus, the fluid pressure within the secondary chamber 150 increases and fluid flows out through the conduit 18 to the wheel brakes 24. During normal brake apply, the ball 192 of the isolation valve 28 is typically unseated from the valve seat 196, thereby permitting the flow of fluid from the conduit 18 to the wheel brakes 24 via the axial bore 186, and the passageways 188 of the isolation valve 28a, and the conduit 30. Note that during normal brake apply, the ball 210 of the dump valve 32 is typically seated against the valve seat 214, thereby preventing the flow of fluid between the conduit 34 and the reservoir 20. When the brake pedal 14 is released by the driver, the pressure within the primary and secondary chambers 142 and 150, the return spring 140, and the caged spring assembly 120 assist in returning the primary and secondary piston 112 and 114 to their rest positions, as shown in FIGS. 3 and 4, such that the pressurized fluid from the wheel brakes 22 and 24 flows back into the primary and secondary chambers 142 and 150, respectively.

During normal brake apply, if the ECU 46 detects excessive lockup of the wheel brakes 24, the brake system 10 may enter into an ABS mode. Entering into an ABS event, the ECU 46 actuates the isolation valve 28 to a closed position. In the closed position, the solenoid 189 is actuated to cause the armature 190 to move in a direction towards the body 180. Movement of the armature 190 seats the ball 192 against the valve seat 196, thereby closing off fluid communication between the axial bore 186 and the passageways 188. Thus, fluid is prevented from flowing from the secondary chamber 150 to the wheel brakes 24, thereby holding the pressure within the conduit 30 at its present level. If, after the isolation valve 28 has been closed, the wheel deceleration rate of the wheels associated with the wheel brakes 24 exceeds a predetermined amount, the ECU 46 may actuate the dump valve 32 to an open position to reduce the pressure within the conduit 30. In the open position, the solenoid 207 is actuated to cause the armature 208 to move in a direction away from the body 200. Movement of the armature 208 unseats the ball 210 from the valve seat 214, thereby allowing fluid communication between the wheel brakes 24 and the reservoir 20 via the conduit 34, the axial bore 204, the passageways 206, and the conduits 38 and 40. The brake system 10 may enter into a series of pressure dumping of the fluid in the conduit 30.

In some instances, after an impeding lockup condition has been corrected under an ABS mode, it is desirable to reapply additional pressure to the wheel brakes 24 to increase braking. Under these conditions, the pressure held in the conduit 30 to the wheel brakes 24 can generally be increased to provide further braking without causing a lockup condition of the wheel brakes 24. This can be accomplished by momentarily opening the isolation valve 28 to permit the higher pressure fluid in the conduit 18 to be supplied to the conduit 30. To open the isolation valve 28, the solenoid 189 is actuated, such as by de-energizing the coils, causing the armature 190 to move in a direction away from the body 180. Thus, the ball 192 unseats from the valve seat 196, thereby permitting the flow of fluid between the axial bore 186 and the passageways 188. Due to a continuous braking effort by the driver on the brake pedal 14 under a hard braking condition, the pressure in the conduit 18 will generally be higher than the pressure in the conduit 30.

Normally, during braking or an ABS event, the cut-off valve 36 remains in an open position, as shown in FIG. 3, to permit the flow of fluid from the dump valve 32 to the reservoir 20 via the conduits 38 and 40. The cut-off valve 36 remains in an open position when the extension pin 168 of the axial stem 160 is positioned a sufficient distance downward, as viewing FIG. 3, so that the valve seal 162 remains unseated from the valve seat 174. However, sufficient leftward movement of the secondary piston 114 may cause the cut-off valve 36 to move into a closed position by providing clearance to permit the axial stem 160 to move upward, as viewing FIG. 3. In the closed position, the secondary piston 114 has moved a sufficient distance to the left, as viewing FIG. 4, so that the extension pin 168 of the axial stem 160 is ramped upward along the surface of the frustoconical portion 136 or along the small diameter portion 138. The frustoconical portion 136 provides a ramped surface for the extension pin 168 to travel along when the cut-off valve moves from its open position 36a to its closed position 36b. After the axial stem 160 has moved a sufficient distance upward, the valve seal 162 will seat against the valve seat 174, thereby closing off fluid communication between the axial bore 204 (the conduit 38) from the dump valve 32 and the low pressure chamber 156 which is in fluid communication with the reservoir 20. Thus, if the dump valve 32 happens to be faulty and fluid is leaking through the dump valve 32 when the dump valve 32 is in its closed position 32a, the secondary piston 114 will advance leftward to compensate for the loss in pressure from the fluid escaping from the conduit 30. After a sufficient distance, the extension pin 168 will ramp upward along the frustoconical portion 136 or the small diameter portion 138 to seat the valve seal 162 against the valve seat 174, thereby preventing the draining of pressurized fluid from the conduits 30 and 34 to the reservoir 20. Also, if the secondary piston 14 has reached a position near the end of its travel length, the cut-off valve 36 may be actuated to a closed position to prevent further dumping of fluid from the conduit 30, regardless of the position of the dump valve 32.

Generally, during braking, the fluid pressure in the secondary chamber 150 and the conduit 18 will be greater than or equal to the pressure in the conduit 30 due to the continuous braking effort of the driver on the brake pedal 14. Therefore, during braking, the plunger 224 of the reset switch 44 is generally biased downward, as viewing FIG. 3 so that the pin 232 contacts the electrical contact 236. When the driver releases the pedal 14, the pressure in the secondary chamber 150 will generally be less than the pressure in the conduit 34 from the wheel brakes 24, thereby causing the plunger 224 to be biased upward to disengage contact between the pin 232 and the electrical contact 236. Thus, the reset switch 44 can generate a signal to alert the ECU 46 that the driver has released the brake pedal 14. If desired, the plunger 224 can be biased upward, as viewing FIG. 3, by a spring (not shown) acting against the lower end of the plunger 224, so that no electrical contact is made between the pin 232 and the electrical contact 236 when the master cylinder 12 is not actuated.

Figure 5:
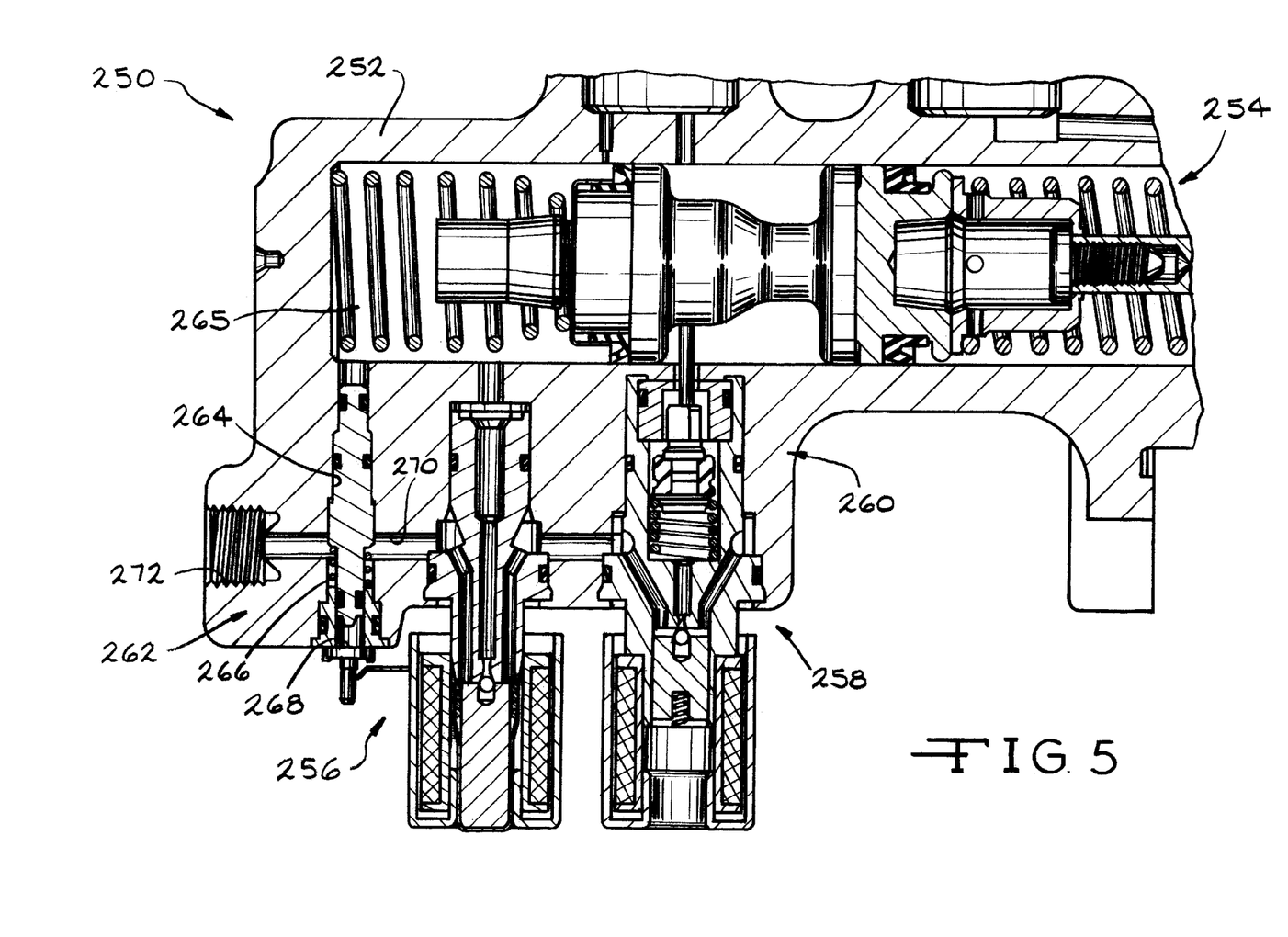
FIG. 5 is a partial sectional view of a second embodiment of a hydraulic control unit (HCU).

There is shown in FIG. 5 a second embodiment of an HCU, indicated generally at 250 which is similar in function and structure as the HCU 100 illustrated in FIGS. 2 through 4. The HCU 250 generally includes a housing 252 having a master cylinder 254, an isolation valve 256, and a dump valve 258. The dump valve 258 has a cut-off valve 260 integrally mounted therein. The HCU 250 also includes an electronic reset switch 262 slidably disposed within a bore 264 formed in the housing 252. The reset switch 262 is biased in a direction towards a secondary chamber 265 of the master cylinder 254 by a spring 266. The reset switch 262 is similar in structure and function as the reset switch 44 of the HCU 100. The reset switch 262 is electrically connected to the ECU 46 and informs the ECU 46 if after an ABS braking event the driver of the vehicle has released the brake pedal 14. The reset switch 262 senses the pressure differential between the isolation valve 256 and the secondary chamber 265 of the master cylinder 254 and moves accordingly to engage or disengage an electrical contact 268.

The reset switch 250 may also provide for a fluid flow restriction through a conduit 270 in fluid communication between the isolation valve 256 and an outlet port 272 in fluid communication with wheel brakes, such as the wheel brakes 24 of the brake system 10. During normal brake apply, the reset switch 250 is preferably positioned such that there is no substantial fluid restriction between the isolation valve 256 and the wheel brakes 24. However, during an ABS braking event, the reset switch 250 preferably moves to a position within the bore 264 to restrict the flow of fluid in the conduit 270. This fluid restriction provides for better pressure control by decreasing the pressure gradient between the isolation valve 256 and the wheel brakes 24. Thus, the reset switch 250 allows pressure to be increased in relatively small increments by pulsing the isolation valve 256, yet does not cause excessive fluid flow restriction during normal braking.

In accordance with the provisions of the patent statutes, the principle and mode of operation of this invention have been explained and illustrated in its preferred embodiment.

However, it must be understood that this invention may be practiced otherwise than as specifically explained and illustrated without departing from its spirit or scope.

What is claimed is:

1. A vehicle brake system comprising:
   a wheel brake;
   a master cylinder operable to provide pressurized fluid to said wheel brake, said master cylinder including a housing having a bore formed therein, said master cylinder further including a piston slidably disposed in said bore, said piston having a ramped surface formed thereon;
   a fluid conduit between said master cylinder and said wheel brake, wherein movement of said piston with said bore of said housing of said master cylinder causes an increase in fluid pressure in said conduit for actuation of said wheel brakes;
   a fluid reservoir being in selective fluid communication with said bore of said master cylinder;
   an isolation valve movable between an open position, wherein fluid is permitted to flow between said master cylinder and said wheel brake, and a closed position, wherein fluid is restricted from flowing between said master cylinder and said wheel brake;
   a dump valve movable between a closed position, wherein fluid is prevented from flowing between said wheel brake and said reservoir, and an open position, wherein fluid is permitted to flow between said wheel brake and said reservoir; and
   a cut-off valve movable between an open position, wherein fluid is permitted to flow between said dump valve and said reservoir, and a closed position, wherein fluid is restricted from flowing between said dump valve and said reservoir, said cut-off valve having a contact member in sliding engagement with said ramped surface of said piston said master cylinder, wherein said cut-off valve is mechanically actuated between said open and closed positions by the cooperation of said contact member and said ramped surface.

2. The brake system of claim 1, wherein said master cylinder, said isolation valve, said dump valve, and said cut-off valve are disposed in a single housing.

3. The brake system of claim 1, wherein said cut-off valve is movable between said open and closed positions in dependence of the position of said piston of said master cylinder.

4. The brake system of claim 1, wherein said ramped surface of said piston of said master cylinder is defined by a frustoconical portion formed about said piston.

5. The brake system of claim 4, wherein said frustoconical portion is axially aligned along a first axis, and wherein said contact member engages said frustoconical portion such that movement of said frustoconical portion along said first axis moves said contact member along a second axis, said contact member being operatively connected to a valve member of said cut-off valve which is movable between a first position and a second position, wherein when said valve member is in said first position, said valve member engages a valve seat to close off fluid communication between said dump valve and said reservoir, and wherein when said valve member is in said second position, said valve member is unseated from said valve seat, thereby permitting the flow of fluid from said dump valve to said reservoir.

6. The brake system of claim 1 further including a switch having a plunger movable between an engaged position with an electrical contact and a disengaged position with said electrical contact, said plunger being biased by the pressure differential between the pressure generated by the said master cylinder and the pressure at said wheel brake.

7. The brake system of claim 1 further including a metering valve which restricts the flow of fluid between said isolation valve and said wheel a brake.

8. A hydraulic control unit for a brake system operable to provide pressurized fluid to a wheel brake, the hydraulic control unit comprising:
   a housing having first, second, and third bores formed therein;
   a master cylinder having a piston slidably disposed in said first bore, said first bole and said piston defining a fluid chamber in communication with a wheel brake such that movement of said piston causes an increase in fluid pressure in said fluid chamber for actuating a wheel brake, said piston having a ramped surface formed therein;
   a fluid reservoir selectively in fluid communication with said fluid chamber;
   an isolation valve disposed in said second bore of said housing, said isolation valve movable between an open position, wherein fluid is permitted to flow between said fluid chamber and the wheel brake, and a closed position, wherein fluid is restricted from flowing between said fluid chamber and the wheel brake;
   a dump valve disposed in said third bore of said housing, said dump valve movable between a closed position, wherein fluid is prevented from flowing between the wheel brake and said reservoir, and an open position, wherein fluid is permitted to flow between the wheel brake and said reservoir; and
   a cut-off valve in fluid communication between said dump valve and said reservoir, said cut-off valve including:
       a contact member slidably engaged with said ramped surface of said piston,;
       a valve seat; and
       a valve member movable between an open position, wherein said valve member is unseated from said valve seat such that fluid is permitted to flow between said dump valve and said reservoir, and a closed position, wherein said valve member is seated on said valve seat such that fluid is restricted from flowing between said dump valve and said reservoir, said valve member movable between said open and closed positions by movement of said piston which causes movement of said contact member along said ramped surface, thereby seating or unseating said valve member relative to said valve seat.

9. The hydraulic control unit of claim 8, wherein said ramped surface of said piston is defined by a frustoconical portion formed about said piston.

10. The hydraulic control unit of claim 8 further including a switch having a plunger movable between an engaged position with an electrical contact and a disengaged position with said electrical contact, said plunger being biased by the pressure differential between the pressure within said fluid chamber and the pressure at the wheel brake.

11. A vehicle brake system comprising:
    a wheel brake;
    a master cylinder operable to provide pressurized fluid to said wheel brake, said master cylinder including a housing having a bore formed therein, said master cylinder further including a piston slidably disposed in said bore;

a fluid reservoir being in selective fluid communication with said bore of said master cylinder;

an isolation valve movable between an open position, wherein fluid is permitted to flow between said master cylinder and said wheel brake, and a closed position, wherein fluid is restricted from flowing between said master cylinder and said wheel brake;

a dump valve movable between a closed position, wherein fluid is prevented from flowing between said wheel brake and said reservoir, and an open position, wherein fluid is permitted to flow between said wheel brake and said reservoir, said dump valve including a housing having a bore; and a cut-off valve disposed in said bore of said dump valve, said cut-off valve movable between an open position, wherein fluid is permitted to flow between said dump valve and said reservoir, and a closed position, wherein fluid is restricted from flowing between said dump valve and said reservoir.

12. A vehicle brake system comprising:

a wheel brake;

a master cylinder operable to provide pressurized fluid to said wheel brake, said master cylinder including a housing having a bore formed therein, said master cylinder further including a piston slidably disposed in said bore;

a fluid reservoir being in selective fluid communication with said bore of said master cylinder;

an isolation valve movable between an open position, wherein fluid is permitted to flow between said master cylinder and said wheel brake, and a closed position, wherein fluid is restricted from flowing between said master cylinder and said wheel brake;

a dump valve movable between a closed position, wherein fluid is prevented from flowing between said wheel brake and said reservoir, and an open position, wherein fluid is permitted to flow between said wheel brake and said reservoir; and a cut-off valve movable between an open position, wherein fluid is permitted to flow between said dump valve and said reservoir, and a closed position, wherein fluid is restricted from flowing between said dump valve and said reservoir, and wherein said cut-off valve is electrically actuated between said open and closed positions by a solenoid.

* * * * *

UNITED STATES PATENT AND TRADEMARK OFFICE
CERTIFICATE OF CORRECTION

PATENT NO. : 6,217,132 B1
DATED : April 17, 2001
INVENTOR(S) : Glenn R. Gualdoni et al.

Page 1 of 1

It is certified that error appears in the above-identified patent and that said Letters Patent is hereby corrected as shown below:

Column 11, claim 1,
Line 32, after "piston" insert -- of --.

Column 12, claim 7,
Line 3, delete "a".

Column 12, claim 8,
Line 7, delete "bole" and insert -- bore --.

Signed and Sealed this

Twentieth Day of November, 2001

Attest:

NICHOLAS P. GODICI
*Acting Director of the United States Patent and Trademark Office*

*Attesting Officer*